United States Patent [19]

Sengul et al.

[11] Patent Number: 5,476,145
[45] Date of Patent: Dec. 19, 1995

[54] SELECTIVE PLACEMENT OF A PERMEABILITY-REDUCING MATERIAL IN A SUBTERRANEAN INTERVAL TO INHIBIT VERTICAL FLOW THROUGH THE INTERVAL

[75] Inventors: M. Marc Sengul, Dhahran, Saudi Arabia; Robert D. Sydansk, Littleton, Colo.

[73] Assignee: Marathon Oil Company, Findlay, Ohio

[21] Appl. No.: 240,406

[22] Filed: May 10, 1994

[51] Int. Cl.⁶ .......................... E21B 33/138; E21B 43/22
[52] U.S. Cl. ................ 166/295; 166/270; 166/305.1
[58] Field of Search ................... 166/269, 270, 166/292, 294, 295, 300, 305.1, 313

[56] References Cited

U.S. PATENT DOCUMENTS

| | | | |
|---|---|---|---|
| 1,661,270 | 3/1928 | Ryder et al. | 166/269 X |
| 2,402,588 | 6/1946 | Andresen . | |
| 2,837,163 | 6/1958 | Ramos et al. | 166/269 X |
| 3,093,192 | 6/1963 | Allen . | |
| 3,369,605 | 2/1968 | Donaldson et al. . | |
| 4,086,964 | 5/1978 | Dilgren et al. | 166/272 |
| 4,387,770 | 6/1983 | Hill | 166/305 R |
| 4,428,429 | 1/1984 | Felber et al. | 166/294 |
| 4,676,318 | 1/1987 | Myers et al. | 166/293 |
| 4,683,949 | 8/1987 | Sydansk et al. | 166/270 |
| 4,694,906 | 9/1987 | Hutchins et al. | 166/294 |
| 4,706,754 | 11/1987 | Smith | 166/295 |
| 4,842,068 | 6/1989 | Vercaemer et al. | 166/269 |
| 4,903,771 | 2/1990 | Hanssen et al. | 166/292 |
| 4,971,150 | 11/1990 | Sanchez | 166/245 |
| 5,002,127 | 3/1991 | Dalrymple et al. | 166/295 |
| 5,060,730 | 10/1991 | Kisman et al. | 166/305.1 |
| 5,067,564 | 11/1991 | Sydansk | 166/270 |
| 5,259,453 | 11/1993 | Johnson | 166/295 |

FOREIGN PATENT DOCUMENTS

0380150A1  8/1990  European Pat. Off. .

*Primary Examiner*—George A. Suchfield
*Attorney, Agent, or Firm*—Jack L. Hummel; Jack E. Ebel

[57] ABSTRACT

A process is provided for selectively placing a permeability-reducing material in an interval of a subterranean hydrocarbon-bearing formation penetrated by a well bore to inhibit the vertical flow of fluid between the well bore and an aquifer underlying the interval. The process is performed by simultaneously injecting a pair of fluids into the well bore, wherein one fluid has a density substantially less than the density of the other, and displacing the fluids out into the interval. The two fluids directly contact one another as they are displaced, however, the density difference between the fluids causes the first fluid to preferentially enter an upper portion of the interval and the second fluid to preferentially enter a lower portion of the interval under the force of gravity stratification or gravity segregation. The second fluid is aged in the lower portion of the interval, transforming it into a permeability-reducing material that substantially inhibits vertical flow between the aquifer and the well bore.

20 Claims, 2 Drawing Sheets

SELECTIVE PLACEMENT OF A PERMEABILITY-REDUCING MATERIAL IN A SUBTERRANEAN INTERVAL TO INHIBIT VERTICAL FLOW THROUGH THE INTERVAL

BACKGROUND OF THE INVENTION

1. Technical Field

The invention relates to a process for recovering hydrocarbons from a subterranean formation, and more particularly to a hydrocarbon recovery process using a permeability-reducing material.

2. Background Information

Selective placement of a treatment material in a particular location of a subterranean hydrocarbon-bearing formation is oftentimes critical to the success of a treatment process designed to facilitate the recovery of hydrocarbons from the formation. In contrast, non-specific placement of the treatment material in the formation can negate the treatment process, diminishing rather than facilitating hydrocarbon recovery from the formation.

The present invention is one such treatment process that requires selective placement of the treatment material in the formation. The invention is directed in particular to selective placement of the treatment material in a subterranean hydrocarbon-bearing formation to inhibit vertical flow of fluids between a well bore and an aquifer underlying a hydrocarbon production or fluid injection interval of the formation, wherein the interval is in fluid communication with both the aquifer and the well bore.

When hydrocarbons are radially produced from the formation through the production interval into the well bore, water from the underlying aquifer tends to migrate vertically through water-permeable flow paths in the production interval to the near well bore region of the production interval. This phenomenon, termed "water coning," has two primarily negative consequences. The first is that water entering the production interval can block or significantly diminish the radial flow of hydrocarbons from the outlying formation into the well bore. The second is that water production can compete with and diminish hydrocarbon production. As a result, the ratio of water to hydrocarbons produced from the well bore can become unacceptably high.

The inverse problem to water coning exists when hydrocarbon recovery fluids such as hydrocarbon displacement fluids are injected into the injection interval via the well bore to displace hydrocarbons toward an adjoining hydrocarbon production well bore. If fluid communication exists between the injection interval and the underlying aquifer, particularly in the near well bore region, the displacement fluid has a propensity to be undesirably diverted away from the radially outlying hydrocarbon-bearing formation into the underlying aquifer where the displacement fluid is dissipated without effectively contacting any hydrocarbons.

The desirability of selectively placing a treatment material in a lower portion of the production or injection interval of a formation to inhibit vertical flow of fluids between the well bore and underlying aquifer has been demonstrated in U.S. Pat. No. 5,067,564 to Sydansk. In accordance with the teaching of Sydansk, a gelation solution and a gas are sequentially injected into the well bore being treated. The gas overdisplaces the gelation solution from the upper portion of the interval while permitting the gelation solution to remain in the lower portion of the interval where it sets up as a permeability-reducing gel.

The process of Sydansk is not entirely satisfactory, however, insofar as sequential injection of the gelation solution and gas into the formation can be relatively time consuming and correspondingly costly as the result of extended production or injection well downtime. Furthermore, some residual gelation solution may remain in the upper portion of the interval even after the upper portion is swept with an overdisplacement gas, thereby undesirably diminishing the subsequent permeability of the upper portion to hydrocarbons or recovery fluids.

U.S. Pat. No. 4,387,770 to Hill discloses a process for selective placement of a treatment fluid in a formation. A pair of fluids having different densities are initially placed in the well bore and permitted to gravity segregate therein. A treatment fluid having an intermediate density is subsequently injected into the well bore and selectively enters the formation at the interface of the two previously injected fluids.

U.S. Pat. No. 5,002,127 to Dalrymple et al selectively places a pair of treatment fluids in a formation by simultaneously, but separately, injecting the two fluids into the formation at different vertical locations determined by the positioning of a packer in the well bore. Commingling of the treatment fluids in the outlying formation is inhibited by injecting the two fluids at controlled injection pressures.

U.S. Pat. No. 3,369,605 to Donaldson et al discloses a process for selectively injecting a displacement gas into a formation to prevent water-coning. The gas is selectively directed into the formation by means of a packer positioned in the well bore and a series of sealed horizontal fractures formed in the near well bore region of the formation to drive hydrocarbons toward the well bore while driving water away from the well bore.

It is apparent from the above-described processes that an operationally simplified and more effective alternative is needed to selectively place a treatment material in a hydrocarbon production or fluid injection interval for inhibiting vertical flow between a well bore and an aquifer underlying the interval. Accordingly, it is an object of the present invention to satisfy these needs.

In particular, it is an object of the present invention to provide a process for selectively placing a treatment material in a near well bore region of a subterranean hydrocarbon-bearing formation, wherein the injection time of the treatment material is shortened to reduce the time that the well bore is inoperable. It is further an object of the present invention to provide a process for selectively placing a treatment material in a formation which avoids the use of complex, costly and often problematic mechanical packers. It is yet another object of the present invention to provide a process for selectively placing a treatment material in a formation which effectively avoids substantial entry of the treatment material into the upper portion of the interval being treated throughout the duration of the treatment and thereafter.

SUMMARY OF THE INVENTION

The present invention is a process for selectively placing a non-flowing permeability-reducing material in an interval of a subterranean hydrocarbon-bearing formation that is in fluid communication with the surface via a well bore. The permeability-reducing material is selectively placed in the interval to inhibit the vertical flow of fluid between the well bore and an aquifer underlying the interval, wherein the aquifer is in fluid communication with the interval via permeable matrix or an anomaly.

In one embodiment, the invention is a preventative or remedial water-coning treatment process. The permeability-reducing material is selectively placed in the interval to inhibit the vertical flow of water from the aquifer through the interval and into the well bore during hydrocarbon production from the interval. The permeability-reducing material, nevertheless, substantially avoids inhibiting the radial flow of hydrocarbons residing in the interval into the well bore.

In another embodiment of the invention, the permeability-reducing material is selectively placed in the interval to inhibit the vertical flow of subsequently injected hydrocarbon recovery fluids from the well bore through the interval and into the aquifer. The permeability-reducing material also avoids substantially inhibiting the radial flow of hydrocarbon recovery fluids away from the well bore to hydrocarbons residing in the interval.

The process is initiated by interrupting normal operation of the well bore and thereafter simultaneously injecting a pair of fluids into the well bore, wherein one fluid has a density substantially less than the density of the other. The first less dense fluid is preferably a gas, while the second more dense fluid is preferably a flowing liquid precursor of the non-flowing permeability-reducing material. The gas and liquid precursor are substantially immiscible in one another and the liquid precursor is substantially non-foaming in the presence of the gas.

The two fluids are simultaneously displaced along the length of the well bore and out into the interval. The interval is characterized as having a lower portion proximal to the aquifer and an upper portion distal to the aquifer. Codisplacement of the fluids along the length of the well bore may be via common well bore tubing providing substantial contact between the fluids therein, or may be via segregated well bore tubing providing substantial isolation of the fluids in the well bore. In any case, the two fluids directly contact one another as they are displaced out of the well bore into the interval. The first fluid, however, tends to enter the upper portion of the interval, while the second fluid tends to enter the lower portion of the interval due to the density difference between the two fluids.

Once the second fluid is selectively placed in the lower portion of the interval, the fluid is aged causing it to set up therein. Aging transforms the second fluid into the desired non-flowing permeability-reducing material that substantially inhibits vertical flow between the aquifer and the well bore through the lower portion of the interval. Thereafter, normal operation of the well bore is resumed for the production of hydrocarbons from the well bore, or for the injection of hydrocarbon recovery fluids into the well bore.

Practice of the present invention will be further understood from the accompanying drawing taken in conjunction with the accompanying description. dr

DESCRIPTION OF PREFERRED EMBODIMENTS

Figure 1:
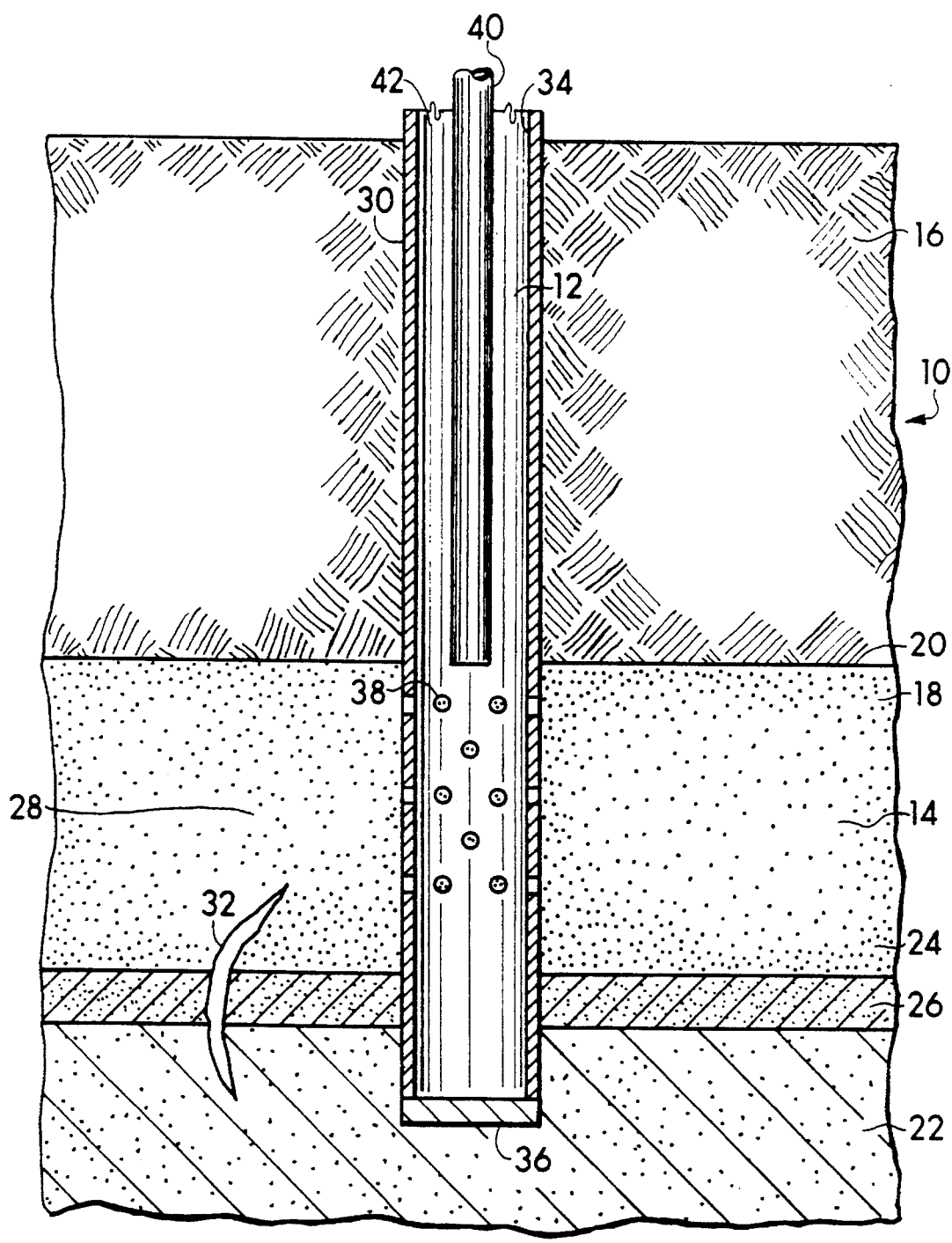
FIG. 1 is a schematic representation of a subterranean hydrocarbon-bearing formation treatable by the process of the present invention.

Referring initially to FIG. 1, a subterranean formation generally designated 10 is penetrated by a well bore 12 extending from the surface (not shown) into the formation 10. The formation 10 contains an interval 14 of hydrocarbon-bearing geologic material extending radially from the well bore 12. The interval 14 is generally permeable to fluids residing in the formation 10 and to non-resident fluids injected therein. Resident and non-resident fluids to which the interval 14 is generally permeable include liquid and gaseous hydrocarbons, aqueous liquids, and non-hydrocarbon gases.

An overburden 16 of geologic material is above the interval 14, bordering the upper portion 18 of the interval to define an interface 20 that provides a substantially fluid impermeable barrier between the interval 14 and overburden 16. Underlying the interval 14 is an aquifer 22 of porous geologic material that is permeable to the aquifer water, typically a brine, residing therein. The interval 14 has a lower portion 24 proximal to the aquifer 22 relative to the upper portion 18 that is distal to the aquifer 22.

The interval 14 is in fluid communication with the aquifer 22, undesirably enabling the vertical flow of fluids between interval 14 and aquifer 22 under certain operating conditions. In particular, fluid communication between the interval 14 and aquifer 22 enables the flow of aquifer water from the aquifer 22 into the near well bore region 28 of the interval 14 according to a water-coning mechanism when the well bore 12 produces hydrocarbons under a sufficient production drawdown pressure.

Conversely, fluid communication between the interval 14 and aquifer 22 undesirably enables the flow of hydrocarbon recovery fluids from the near well bore region 28 of the interval 14 into the aquifer 22 when such fluids are being injected into the well bore 12 at a sufficient injection pressure. The near well bore region 28 is defined herein as a volume of the formation 10 extending a finite radial distance from the well bore face 30, i.e., preferably extending not more than about 30 meters from the well bore face 30.

An intervening stratum 26 may be present between the lower portion 24 of the interval and the aquifer 22 through which fluids must flow to enable fluid communication between the interval 14 and aquifer 22. Where the intervening stratum 26 is made up of permeable matrix, the matrix is a direct conduit for fluid flow therethrough. Alternatively, an anomaly extending across the stratum 26 is a flow channel therethrough, where the stratum 26 is made up of substantially impermeable material.

An anomaly is generally defined herein as a volume within a formation having a very high permeability relative to the matrix. The term "anomaly" is inclusive of such highly permeable volumes as fractures, fracture networks, joints, cracks, fissures, vugs, voids, solution channels, caverns, washouts, cavities, and the like. The matrix is generally characterized as substantially continuous, sedimentary geologic material having a very low permeability relative to an anomaly. In addition, the matrix is often competent.

A representative anomaly 32 is shown in FIG. 1 providing fluid communication between the aquifer 22 and interval 14. Most typically, the anomaly providing fluid communication between the aquifer 22 and interval 14 is a vertical fracture. The term "vertical fracture", as used herein, encompasses a single vertical fracture extending between the aquifer 22 and interval 14, a plurality of isolated vertical fractures each extending between the aquifer 22 and interval 14, or a vertical fracture network comprising a plurality of interconnected vertical fractures, which extends between the aquifer 22 and interval 14 in series.

Although not shown in the drawing, it is apparent that the process of the invention is likewise applicable to formations, wherein the lower portion of the interval directly abuts the aquifer. In that case, fluid communication between the interval and aquifer is across the permeable matrix interface of the interval and aquifer, or through an anomaly, such as a vertical fracture, extending between the interval and aquifer.

Referring again to FIG. 1, the well bore 12 extends from the surface at least as far as the interval 14 and extends further, as shown here, into the aquifer 22. Direct fluid communication between the aquifer 22 and the surface via the well bore 12, however, is prevented by a conventional casing 34 lining the well bore 12 and a plug 36 at the bottom of the casing 34. Perforations 38 positioned in the casing 34 adjacent to the interval 14 provide direct fluid communication between the surface and the interval 14 via the well bore 12, thereby enabling production of hydrocarbons from the interval 14 or injection of fluids into the interval 14, depending on the operational mode of the well bore 12.

A tubing string 40, such as coiled, injection or production tubing, extends concentrically within the casing 34 from the surface to the upper onset of the perforations 38, thereby defining an annulus 42 between the tubing string 40 and casing 34. The tubing string 40 and annulus 42 provide alternate conduits for injection of fluids into the wellbore 12. It is understood, however, that the practice of the present invention is not limited to the specific well bore configuration shown herein. Substantially any well bore configuration within the purview of the skilled artisan is within the scope of the present invention to the extent the configuration permits injection of fluids into the well bore in the manner described hereafter.

The process is initiated by interrupting normal operation of the well bore 12, whether in the mode of a conventional hydrocarbon production well bore or a conventional hydrocarbon recovery fluid injection well bore. The term "hydrocarbon recovery fluid" is used broadly herein to denote substantially any known gaseous or liquid fluid that may be displaced into the interval 14 to facilitate recovery of hydrocarbons from the formation 10, including miscible and immiscible displacement fluids.

Upon cessation of normal well bore operation, two distinctly different treatment fluids are coinjected into the well bore 12 The term "coinjection" as defined herein, denotes the simultaneous injection of two different fluids into the same well bore such that the fluids travel through the well bore and exit the well bore into the formation at substantially the same time, thereby contacting one another upon displacement into the formation. It is discretionary, however, within the purview of the skilled artisan to displace the two fluids along the length of the well bore through separate or common tubing as desired, thereby providing fluid segregation or fluid contacting along the major portion of the well bore length.

In accordance with the configuration of FIG. 1, coinjecting both fluids simultaneously into the tubing 40, or alternatively, coinjecting both fluids simultaneously into the annulus 42, provides prolonged fluid contacting. Coinjecting one fluid of the pair into the tubing 40 while simultaneously coinjecting the other fluid into the annulus 42 provides delayed fluid contacting. Nevertheless, both alternatives are encompassed by the present process insofar as contacting of the two fluids occurs in either alternative during displacement of the fluids from the well bore 12. In particular, it is apparent from FIG. 1 that contacting of injected fluids occurs within the well bore 12 adjacent to the perforations 38 and through the perforations 38 out into the formation 10.

The first fluid of the present invention is characterized as being substantially less dense than the second fluid. As such, the first fluid is preferably in a gaseous state, whereas the second fluid is preferably in a liquid state upon injection into the well bore 12 and displacement therefrom into the formation 10. The second fluid is more preferably specifically characterized as a flowing liquid precursor of a non-flowing permeability-reducing material. As such, the second fluid is capable of placement in the formation 10 in a flowing liquid state and being transformed therein to the non-flowing state of a permeability-reducing material after the fluid is aged for a predetermined set-up time.

The second fluid is deemed flowing to the extent it is readily displacable from the well bore 12 and through the interval 14 into the lower portion 24 thereof. The permeability-reducing material is deemed non-flowing to the extent it has sufficient structure to resist propagation from the lower portion 24 during subsequent normal well bore operations of hydrocarbon production or hydrocarbon recovery fluid injection.

Preferred compositions of the second fluid satisfying the above-recited criteria are aqueous liquid gelation solutions transformable into non-flowing gels upon aging. Preferred among the gelation solutions are solutions of a crosslinkable polymer and a crosslinking agent in a solvent. Gelation solutions are generally characterizable as either a viscous flowing liquid or a non-viscous flowing liquid, depending on the properties and concentrations of the constituent polymer and crosslinking agent and their degree of crosslinking.

The preferred gelation solutions are precursors of crosslinked polymer gels that are formed upon substantially complete crosslinking of the polymer by the crosslinking agent. Complete crosslinking is achieved when either substantially all of the crosslinking agent or substantially all of the polymer crosslinking sites are consumed as the gelation solution is aged. Prior to complete crosslinking, the composition is substantially uncrosslinked, or only partially crosslinked and, thus, termed a "gelation solution." After complete crosslinking, the composition is termed a "gel." A non-flowing gel is defined herein as a continuous three-dimensional crosslinked polymeric network integrating a liquid into the interstices of the network, generally characterizable as a rigid, semi-rigid, or elastic solid.

Crosslinkable polymers are well known in the art and any such polymer has utility in the gelation solutions of the present invention. Carboxylate-containing polymers, however, are preferred crosslinkable polymers with acrylamide-containing polymers being even more preferred. Of the acrylamide-containing polymers, the most preferred are polyacrylamide (PA), partially hydrolyzed polyacrylamide (PHPA), copolymers of acrylamide and acrylate, and carboxylate-containing terpolymers and tetrapolymers of acrylate. PA, as defined herein, has from about 0% to about 3% of its amide groups hydrolyzed. PHPA has greater than about 3% of its amide groups hydrolyzed.

The crosslinking agent of the gelation solution effectuates crosslinking between appropriate sites of the same or other polymer molecules. Crosslinking agents having utility herein are often specific to the particular crosslinkable polymer being used and include organic and inorganic crosslinking agents well known in the art.

A class of crosslinking agents specific to acrylamide-containing polymers are compositions containing a reactive transition metal cation, such as chromium III, chromium VI, aluminum III, iron II, iron III, and zirconium IV. Preferred compositions are those having a chromium III cation complexed or bonded to an anionic ligand and optionally a nonionic ligand, wherein the ligand or ligands are capable of dissociating from the compositions in solution. Nonionic ligands applicable herein include oxygen and water. Anionic ligands applicable herein include monocarboxylate, polycarboxylate, and carboxylate derivative anions, such as acetate, malonate, and glycolate, to name a few, derived from the corresponding acids or salts thereof. Other anionic ligands applicable herein include inorganic anions, such as chloride, sulfate and nitrate, derived from the corresponding acids or salts thereof.

Among the more preferred of the above-listed crosslinking agents, are those termed "delayed crosslinking agents" that initiate polymer crosslinking relatively slowly. In many cases, the delayed crosslinking reaction requires an activation step that is the rate controlling step of the crosslinking reaction and, as such, results in the delaying effect. A preferred delayed crosslinking agent is a complex including the chromium III cation and one or more anionic carboxylate or carboxylate-derivative ligands. The molar ratio of the anionic ligand or ligands to the chromium III cation in solution is preferably about 100:0.5, and more preferably about 20:3. Such high ratios of anionic ligands to chromium III cations can be achieved by supplementing the solution containing the crosslinking agent with an acid or a salt of an anionic ligand that dissociates in solution.

A particularly preferred delayed crosslinking agent is a chromic acetate complex ($CrAc_3$) with or without an excess of acetate or other anionic ligand or ligands, as taught in U.S. Pat. Nos. 4,683,949 and 4,706,754, incorporated herein by reference. The activation step for this particular crosslinking agent is believed to be the physical dissociation of the acetate ligand from the complex with the acetate ligand being exchanged for a carboxylate ligand of the acrylamide-containing polymer to effect crosslinking.

Another particularly preferred delayed crosslinking agent is a chromic malonate complex, wherein the activation step is the chemical decomposition of the malonate ligand to the acetate ligand, with the resulting chromic acetate complex being an intermediary to crosslinking in the manner recited above. Other particularly preferred delayed crosslinking agents are inter alia chromic glycolate and chromic lactate complexes.

The liquid solvent of the gelation solution may be any liquid in which the polymer and crosslinking agent can be dissolved, mixed, suspended or otherwise dispersed to facilitate gel formation. The solvent is preferably an aqueous liquid such as fresh water or a brine.

Figure 2:
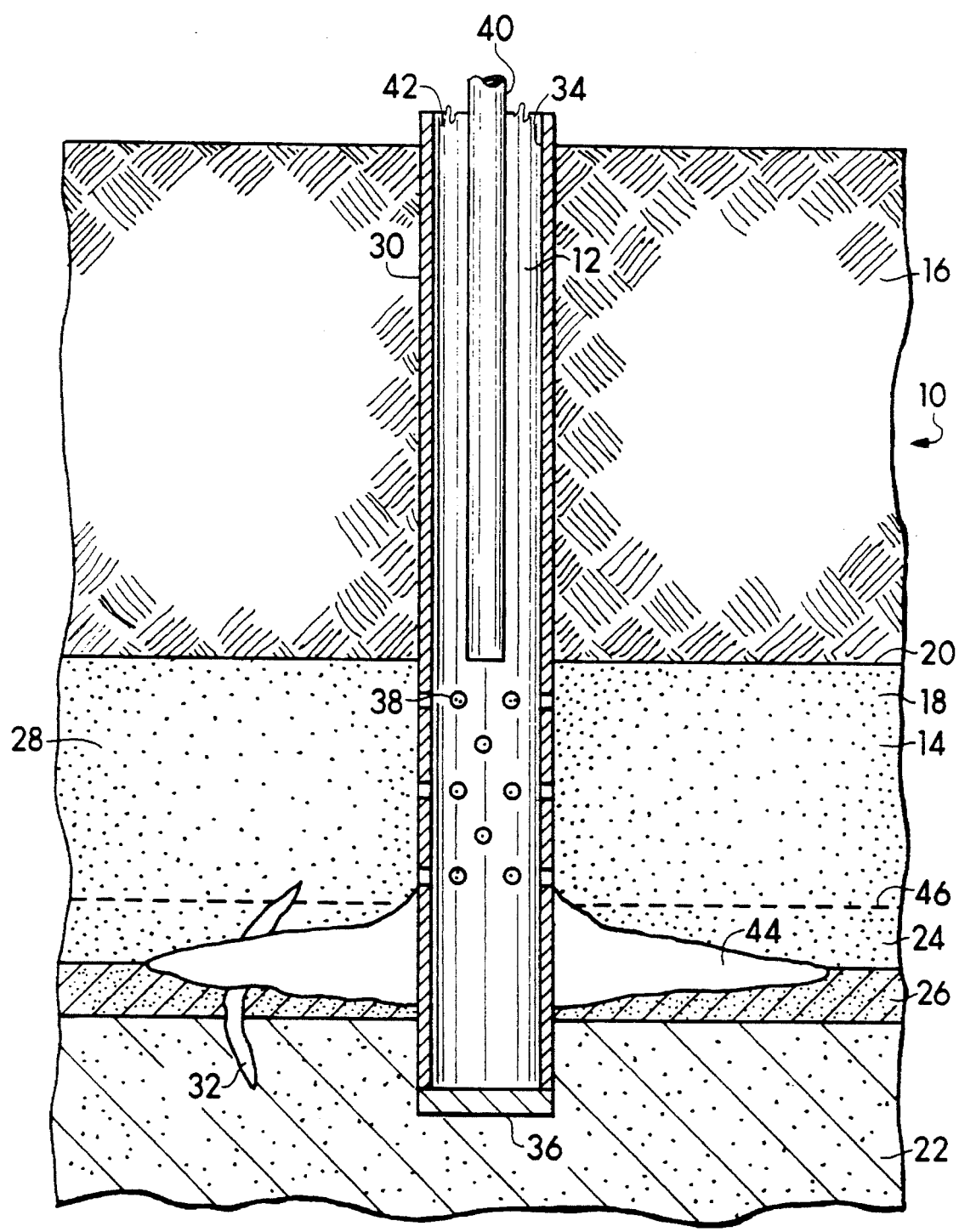
FIG. 2 shows the formation of FIG. 1 after treatment by the process of the present invention.

Referring now to FIG. 2, the formation 10 is shown after selective placement of the permeability-reducing material 44, preferably a non-flowing crosslinked polymer gel, in the formation 10. Specifically, the permeability-reducing material 44 is shown to be selectively placed substantially in the lower portion 24 of the interval 14 as well as in the intervening stratum 26. The lower portion 24 of the interval is schematically delineated from the upper portion 18 of the interval by dashed line 46. Selective placement of the permeability-reducing material 44 is further preferably radially limited to the near well bore region 28 of the formation 10.

The permeability-reducing material 44 accordingly resides substantially in the permeable near well bore matrix of the lower portion 24 and stratum 26, as well as in the anomalies communicating therewith as represented in FIG. 2 by vertical fracture 32, to provide a substantially impermeable barrier to fluid flow through the permeability-reducing material 44. It is further apparent that practice of the present invention can encompass selective placement of the permeability-reducing material 44 in areas of the formation 10 extending downwardly or radially beyond those shown herein, such as in the aquifer 22 or the in the far well bore region of the formation 10. However, such extensive placement is oftentimes unnecessary to effective practice of the invention, and at times can even be undesirable insofar as it increases the cost of the treatment process.

Selective placement of the permeability-reducing material 44 according to the present process effectively minimizes placement of the material 44 in the matrix of the upper portion 18 of the interval 14 beyond the lower onset of perforations 38 which would undesirably inhibit subsequent hydrocarbon production therefrom or hydrocarbon recovery fluid injection therein. The mechanism for selective placement of the permeability-reducing material 44 substantially in the lower portion 24 is the coinjection of the less dense first fluid along with the more dense second fluid into the well bore 12.

The specific gravity of the first fluid is typically between about 0.001 and about 0.2, and preferably between about 0.005 and about 0.1. The specific gravity of the second fluid is typically between about 0.94 and about 2.0, and preferably between about 1.0 and about 1.5. The density difference between the first and second fluids causes gravity stratification or segregation of the two fluids within the well bore 12 or interval 14, upon contact thereof. Gravity stratification is defined herein as density separation of the first and second fluids while flowing within or from the well bore 12, whereas gravity segregation is defined herein as density separation of the first and second fluids in the interval 14.

The first fluid preferentially enters the upper portion 18 of the interval to the exclusion of the second fluid, whereas the second fluid preferentially enters the lower portion 24. Although the first fluid may dissipate over time or may subsequently be displaced from the upper portion 18, it resides therein for a sufficient period of time to prevent substantial migration of the second fluid into the upper portion until the second fluid sets up as the desired non-flowing permeability-reducing material.

The two fluids are coinjected into the well bore 12 at injection rates and pressures readily determinable by one skilled in the art applying the teaching disclosed herein to optimize the preferential entry of the first and second fluids into the upper and lower portions 18 and 24, respectively. The overriding presence of the first fluid relative to the second fluid causes displacement of the second fluid away from the well bore 12 in a substantially radial direction through the interval 14. Consequently, the resulting barrier of permeability-reducing material 44 often has a significantly greater radial (horizontal) dimension than axial (vertical) dimension.

Gravity stratification and segregation of the first and second fluids is facilitated by their relative immiscibility in one another. This property inhibits the formation of fluid dispersions upon contact between the two fluids. Specifically, in a preferred embodiment where the first fluid is a gas and the second fluid is a liquid, the two fluids resist foam formation upon contact and therefore are termed "non-foaming." To further inhibit foam formation, the composition of coinjected fluids is preferably substantially free of any foaming agents, including surfactants and the like as are well known to the skilled artisan, which could otherwise facilitate foaming of the coinjected gas and liquid.

In addition to immiscibility, it is also desirable that the first and second fluids are relatively inert with respect to one another. Preferred gases, satisfying the instant selection criteria, for use in conjunction with the preferred gelation solutions recited above include nitrogen, produced gas, and natural gas. It is noted, however, that virtually any other gas or fluid meeting the density, miscibility, and reactivity requirements set forth herein may have utility in the process of the present invention.

The following example demonstrates the practice and utility of the present invention, but is not to be construed as limiting the scope thereof.

EXAMPLE

An oil production well bore penetrates an oil reservoir located at a depth of 1400 meters. The reservoir pressure is 15,200 kPa, the reservoir temperature is 60° C., and the in-situ oil viscosity is 1.3 cp. Oil production via the well bore is from a clean, high-permeability, semi-consolidated sand formation having a porosity of 24% and an effective permeability of 600 md at $S_{or}$, wherein the vertical and horizontal permeability of the formation are about equal. An oil column having a height of 19 meters, that corresponds to the height of the producing interval adjacent to the well bore, overlies an active aquifer in the producing sand formation. The top 13 meters of the producing interval are perforated to produce oil therefrom.

The production well bore experiences severe water coning evidenced by substantially increased water production and decreased oil production over time. In particular, the well bore initially produces oil at a rate of 284 m³/day and no water. After 1.5 months, the well bore produces oil at a rate of 12 m³/day and water at a rate of 175 m³/day. Accordingly, the treatment process of the present invention is applied to the formation via the well bore for the purpose of reducing water coning. As such, 48 m³ of cooling water at 13° C. are initially injected into the formation via the well bore. Thereafter, the production tubing and annulus are loaded with an incompressible fluid.

The process continues by coinjecting into the formation 32 m³ of an aqueous gelation solution and 7.1×10⁶ standard cubic meters of a gas through the production tubing and coil tubing, respectively. The gelation solution is injected through the production tubing at a rate of 0.04 m³/minute, commencing after initially reaching the sandface. The gelation solution is the precursor of a crosslinked polymer gel containing 5.0 weight % polyacrylamide (PA) that is 0.6 mole % hydrolyzed and has a nominal molecular weight of 500,000. The gel also contains 2.0 weight % KCl and chromic acetate crosslinker that crosslinks the polymer at a PA:CrAc₃ weight ratio of 11:1.

The gas is natural gas consisting essentially of methane and is injected at 0.2 m³/minute through 2.54 cm coil tubing, wherein the bottom of the tubing is placed immediately above the perforations. Coinjection of the gelation solution and gas stratifies the gelation solution over the lower portion of the producing interval without substantially damaging the upper portion of the producing interval.

Once injection of the gelation solution and gas is completed, the well bore is shut in for 96 hours, enabling the gel to fully mature. The well bore is then reperforated over the upper 6.4 meters of the producing interval and a conventional acid wash is applied to the new perforations.

Post-treatment production initially stabilizes at a rate of 183 m³/day for oil and no water. After two months of post-treatment oil production, the well bore produces oil at a rate of 149 m³/day and water at a rate of 11 m³/day. A post-gel treatment production log indicates that over 90% of fluid production emanates from the upper half of the producing interval, whereas a pretreatment production log indicates nearly uniform production entry across the entire 13 meters of perforations. Thus, it is apparent that the treatment reduces excessive water production caused by water coning from the underlying aquifer while maintaining a relatively high level of oil production.

While the foregoing preferred embodiments of the invention have been described and shown, it is understood that alternatives and modifications, such as those suggested and others, may be made thereto and fall within the scope of the present invention.

We claim:

1. A process for inhibiting fluid communication between a subterranean interval and an underlying aquifer comprising:

simultaneously injecting a gas and a second fluid into a well bore in fluid communication with a subterranean interval having an underlying aquifer in fluid communication with said interval, wherein said gas has a density substantially less than the density of said second fluid;

simultaneously displacing said gas and said second fluids through said well bore into said interval having a lower portion proximal to said aquifer and an upper portion distal to said aquifer; and placing said gas into said upper portion of said interval and said second fluid into said lower portion of said interval, thereby substantially inhibiting fluid communication between said aquifer and said upper portion of said interval.

2. The process of claim 1 wherein said second fluid is a substantially non-foaming flowing liquid precursor of a substantially non-flowing permeability-reducing material, and further comprising aging said second fluid in said lower portion of said interval to set up said permeability-reducing material therein.

3. The process of claim 2 wherein said permeability reducing material is a crosslinked polymer gel.

4. The process of claim 3 wherein said gel comprises an acrylamide-containing polymer.

5. The process of claim 3 wherein said gel comprises an acrylamide-containing polymer and a crosslinking agent.

6. The process of claim 5 wherein said crosslinking agent comprises a metal cation.

7. The process of claim 2 wherein said upper portion of said interval is in fluid communication with a hydrocarbon reservoir, and further comprising recovering hydrocarbon from said upper portion via said well bore after said permeability-reducing material sets up in said lower portion of said interval.

8. The process of claim 2 wherein said upper portion of said interval is in fluid communication with a hydrocarbon reservoir, and further comprising displacing a hydrocarbon displacement fluid into said upper portion of said interval via said well bore after said permeability-reducing material sets up in said lower portion of said interval.

9. The process of claim 1 wherein said gas is substantially immiscible in said second fluid.

10. The process of claim 1 wherein said gas and said second fluid are displaced through said well bore in substantial isolation from each other.

11. The process of claim 1 wherein said gas and said second fluid are displaced through said well bore in substantial contact with each other.

12. The process of claim 2 wherein said aquifer is in fluid communication with said interval through one or more substantially vertical fractures in said lower portion of said interval and said permeability-reducing material sets up in said one or more substantially vertical fractures.

13. The process of claim 2 wherein said aquifer is in fluid communication with said interval through permeable matrix in said lower portion of said interval and said permeability-reducing material sets up in said permeable matrix.

14. The process of claim 2 wherein said gas and said second fluid are displaced into a near well bore region of said interval and said permeability-reducing material sets up in said near well bore region of said lower portion.

15. A process for inhibiting fluid communication between a subterranean formation and an underlying aquifer comprising:

simultaneously injecting a gas and a second fluid into a hydrocarbon production well bore in fluid communication with a subterranean hydrocarbon-producing interval having an underlying aquifer in fluid communication with said interval, wherein said gas has a density substantially less than the density of said second fluid;

simultaneously displacing said gas and said second fluid into a near well bore region of said interval having a lower portion proximal to said aquifer and an upper portion distal to said aquifer;

placing said gas into said upper portion of said interval and said second fluid into said near well bore region of said lower portion of said interval; and producing hydrocarbons into said well bore from said upper portion of said interval while substantially inhibiting water coning in said near well bore region of said interval.

16. The process of claim 15 wherein said gas is substantially immiscible in said second fluid.

17. The process of claim 15 wherein said second fluid is a liquid precursor of a substantially non-foaming permeability-reducing material, and further comprising aging said second fluid in said near well bore region of said lower portion of said interval to set up therein as said permeability-reducing material.

18. The process of claim 17 wherein said aquifer is in fluid communication with said interval through one or more substantially vertical fractures in said lower portion of said interval and said permeability-reducing material sets up in said one or more substantially vertical fractures.

19. The process of claim 17 wherein said aquifer is in fluid communication with said interval through permeable matrix in said lower portion of said interval and said permeability-reducing material sets up in said permeable matrix.

20. A process for inhibiting fluid communication between a subterranean interval and an underlying aquifer comprising:

simultaneously injecting a first fluid and a second fluid into a well bore in fluid communication with a subterranean interval having an underlying aquifer in fluid communication with said interval, wherein said first fluid has a density substantially less than the density of said second fluid and wherein said first fluid is injected into a tubing string in said well bore and said second fluid is injected into an annulus in said well bore;

simultaneously displacing said first and second fluids through said well bore into said interval having a lower portion proximal to said aquifer and an upper portion distal to said aquifer; and placing said first fluid into said upper portion of said interval and said second fluid into said lower portion of said interval, thereby substantially inhibiting fluid communication between said aquifer and said upper portion of said interval.

\* \* \* \* \*